United States Patent Office 3,222,525
Patented Dec. 7, 1965

3,222,525
RADIOMETRIC DETECTION OF NON-RADIO-
ACTIVE MATERIALS
Malcolm Thackray, Sutherland, New South Wales, Australia, assignor to Australian Atomic Energy Commission, Coogee, New South Wales, Australia, a statutory authority of Australia
No Drawing. Filed June 27, 1962, Ser. No. 205,494
Claims priority, application Australia, June 30, 1961, 6,438/61
17 Claims. (Cl. 250—106)

The present invention relates to a method for the rapid detection of non-radioactive materials by means of instruments for measuring radio-activity, which method can be adapted, where necessary or desirable, to also determine the concentration of such materials where present It is well known that radio-active substances can be detected and measured by simple instrumental methods at very low concentration levels by virtue of the rays which they emit. For example, an ordinary Geiger counter can easily measure quantities less than $10^{-10}$ g. of the isotope phosphorus-32 and this is by no means exceptional. Therefore, if an inactive substance could be made to react with an active material to form a compound and the compound formed separated from the excess of unreacted active material (as by means of its greater insolubility in the case of a precipitate), then the inactive material could also be determined at the same low level. The reason why this method is not already in widespread use resides in the difficulty of achieving a quantitative separation of an uncontaminated precipitate at these low concentration levels.

The present invention provides a method which allows quantitative results to be obtained even when all the precipitate is not isolated and which allows a fraction of the precipitate to be very rapidly isolated and washed in a form suitable for immediate presentation to apparatus for counting its radioactivity.

Broadly, the present invention provides a method for the detection of non-radioactive materials which comprises impregnating a localized region of a porous medium with a portion of a solution suspected to contain the material; treating said impregnated region with a solution of a radio-active substance which forms a precipitate with said material; washing said impregnated region to remove unreacted radio-active solution; and passing said porous medium to a radiation measuring device to detect any radiation which may be present in said impregnated region.

Furthermore, where such a material has been detected, the invention provides a method of determining the concentration in which it is present by impregnating the porous medium at different places with (a) the solution of unknown strength and (b) a solution of the material of known strength; precipitating the material in both impregnated regions with a radio-active precipitant; removing unreacted precipitant; measuring the radio-activity of the two impregnated regions; and calculating therefrom the concentration of the material in the solution of unknown strength.

In manufacturing and allied industries, the presence in the atmosphere of metallic and similar dusts can constitute a serious health hazard. This is particularly so in the case where these dusts and the like are toxic, such for example as beryllium dust, which is extremely toxic. Therefore, where there is likelihood of the atmosphere being contaminated with such dusts, the need arises for a rapid method for detecting their presence and also for determining their concentration.

In applying the process of the invention to the detection and determination of such dusts, the solution is prepared by absorbing the dust from the atmosphere on a support, e.g., by application of vacuum to a porous pad and treating the solids absorbed with a solvent for the material to be detected.

Of course the method of the invention is not restricted to determining the concentration of such materials in the atmosphere, but can also be used to determine the amount of such materials which are already in the form of solutions, or which can readily be brought into solution.

The invention is based on the discovery that when discs of porous material, as for example filter paper, are impregnated with fixed volumes (say 0.05 ml.) of solutions containing differing amounts of the ion of beryllium $Be^{+2}$ and the discs, after drying, are treated with a solution of di-ammonium phosphate made radio-active by the presence of the isotope phosphorus-32, then the discs after washing and drying, exhibit radio-activity which is directly proportional to the amount of beryllium with which they were initially impregnated. This activity is clearly due to the formation of a precipitate of a phosphate of beryllium in the pores of the paper and, if all the discs are treated throughout in an identical manner, the residual activity is a linear function of the initial beryllium concentration.

From this observation and several others on other precipitates (e.g., silver chloride containing the isotope silver-110m), it became clear that a simple automatic method could be devised for monitoring the concentration of almost any material in solution (as, for example, a given ion in a chemical process stream, phosphate in urine, chloride in tap water, etc.).

All that is required is that the solution (perhaps following some concentration procedure) should be applied at a known rate, either intermittently or continuously, to a region of a porous medium which then (preferably after drying) moves to regions where it is exposed in turn to a radio-active precipitating solution, a wash solution and a radiation counter (in many cases, it is desirable to include a drying step between the washing stage and the counter, but this is not an essential part of the invention). If the unknown solutions are applied intermittently to the porous medium, these may be interspersed with solutions of known strength for calibrating the apparatus.

If the unknown solution is applied continuously at a fixed rate to a moving band of the porous medium so as to produce a line or streak, then the calibrating solutions may be applied to produce lines or streaks running parallel to the line or streak of unknown concentration. In this latter case, each line or streak must have its own counter, or the lines or streaks must be displaced periodically in a direction at right angles to their direction of travel so that each line or streak in turn is presented to the counter.

The invention will now be more particularly described by means of the following illustrative examples showing various methods of carrying the invention into effect.

*Example 1*

In one means for carrying out the invention, a continuous film or strip in the form of a roll of closely woven filter cloth is caused to unroll beneath and in contact with a series of capillary tubes containing liquids at a fixed head or pressure. One capillary applies a streak of a solution containing an unknown amount of beryllium sulphate, while the other capillaries produce identical streaks with beryllium solutions of known strength.

The strip is then dried by means of hot air and passes into a tank of a radio-active solution of decimolar di-ammonium phosphate containing the isotope phosphorus-32. Two or three millicuries per litre of precipitant solution are sufficient to allow precise measurement when more than one microgram of beryllium is applied to one square cm. of porous film or strip. The solution is usually buffered at a pH of 5.5 with sodium acetate, and the complexing agent EDTA is added (these latter measures prevent the co-precipitation of other phosphates with the beryllium ammonium phosphate which would otherwise lead to erroneous results if impurities such as magnesium were present in the solution being analysed).

The impregnated filter cloth then passes through two or more tanks of a wash solution which can be water but which preferably consists of a saturated solution of inactive beryllium ammonium phosphate in a decimolar solution of di-ammonium phosphate (in the latter case, it is necessary that the pH of the solution be greater than 8.0, or the wash solution rapidly removes the activity of the precipitate in the pores of the filter cloth). After drying, the filter cloth passes beneath a series of Geiger counters connected to ratemeters. The outputs from the ratemeters are displayed on a multipoint recorder from which the concentration of beryllium in the unknown solution can be read off.

*Example 2*

In this modification of the invention, the porous medium is a large disc of absorbent paper as, for example, Whatman 42 filter paper. The paper, which in this example is about 1 foot in diameter but which may be any size, rests on a turn table of the same diameter. Around the circumference of the turn table, a series of equidistant holes, each about one inch in diameter, are located. The turn table rotates intermittently, and mechanically driven micrometer syringes deliver 0.05 ml. of a solution of unknown strength with respect to chloride ion to the centre of one region of filter paper resting over a one-inch hole. The table then rotates, and 0.05 ml. of solutions of known strength are applied to the paper above subsequent holes. After impregnation, the holes pass to a region where the paper can be dried by the passage of warm air around it.

The next movement of the table takes the hole (and its covering filter paper) to a region where an aliquot of a solution of acidified silver nitrate, made active with the isotope silver-110m, is applied to it so as to cause a precipitate of silver chloride to form in the pores of the paper. The excess solution is removed by suction applied from below, and then a fixed volume of a wash solution of dilute nitric acid is passed through the paper. Warm air is then drawn through the paper which rotates when dry to a region where it can be presented to a gamma-ray scintillation counter. The output from the counter may be caused to print out after a fixed counting time, or it may be fed via a ratemeter to a multipoint recorder as in Example 1.

*Example 3*

This example is designed to show how the invention can be applied to the partial automation of an analytical process.

Circles of Whatman No. 542 filter paper of cms. diameter were attached to aluminium planchets of slightly larger diameter (such as are frequently employed in the counting of radio-active substances) by means of double-coated adhesive tape. The planchets were arranged in line on a slowly moving conveyor belt and as each planchet came opposite a predetermined point, 0.05 ml. of a solution containing beryllium ion was pipetted onto the centre of the paper. Beryllium solutions of known and unknown concentrations were used in this operation. Each circle, after receiving its aliquot of one of the beryllium solutions, passed beneath a drying lamp before arriving at a second pipetting station where it was treated with 0.1 ml. of a radio-active phosphate solution.

The belt then carried the planchet towards a wash solution which it reached about four minutes later (by which time the precipitation of phosphates of beryllium in the pores of the paper was virtually complete). The planchet was transferred to the wash solution (in this particular case the transfer was done manually but it is not difficult to conceive of a mechanism which would simply divert the conveyor belt beneath the surface of the wash solution).

The paper circle and its planchet were washed for 10 minutes by electrical stirring of the wash solution before being once more manually restored to the conveyor belt. The paper circles then passed beneath a second drying lamp and then towards an automatic counter of beta radiation. The planchets were then transferred to the conveyor mechanism of an automatic counter of beta radiation (in this particular case the transfer from one conveyor system to the other was accomplished manually but it is simple to envisage how the same conveyor system could be used for the entire operation).

The automatic counter then passed the planchets and their paper circles beneath an end-window Geiger counter where the apparatus counted them for a fixed period of time (in this particular case 10 minutes) before printing out the total count obtained and passing the next planchet beneath the counter. In this manner, a series of numbers were obtained from the counter which were directly proportional to the concentration of beryllium in the solutions which were originally applied to the paper circles and from which the concentration of beryllium in unknown solutions could be simply deduced.

In this particular example, the beryllium solutions employed ranged up to 0.05 molar in strength. Each 10 mls. of the applied phosphate solution contained 0.10 g. of diammonium phosphate, 0.26 g. of sodium acetate, 0.5 g. of the di-sodium salt of ethylenediaminetetraacetic acid and about 100 micro-curies of the isotope phosphorus-32. The pH of the solution was adjusted to 5.5 with acetic acid. The presence of sodium acetate was to buffer the pH at a value of 5.5 and the presence of the sodium salt of ethylenediaminetetraacetic acid was to prevent the precipitation of any phosphates other than those of beryllium. The wash solution consisted of a saturated solution of beryllium ammonium phosphate (non-radioactive) adjusted to a pH of 8.0 with ammonia. The automatic counter was a Harwell type 1112 A.

The apparatus gave a background count of about 90 counts per minute when only pure water containing no beryllium was applied to the paper circles. The count became significantly higher when a 0.003 molar beryllium solution was applied to the circles and then continued to increase in a linear manner with the concentration of the beryllium solution until it reached a value of about 4600 counts per minute when 0.05 molar beryllium solution was applied.

In this particular example, the pipetting of the solutions, the transfer to the wash solution and the change from one conveyor to the other were accomplished manually but, even so, the rate at which beryllium solutions could be analysed was considerably speeded up. Since it is well known from the literature that all these processes can be carried out by suitable mechanisms, it is clear that a fully automatic method of analysis could be based on this example.

*Example 4*

In another method of carrying out the invention in a manner which can very simply be made fully automatic, asbestos string was drawn at a constant speed of about one inch per minute by means of a suitable electric motor and a system of chemically resistant pulleys through a series of processing solutions.

The string passed in turn through a wash solution of acetone, through a region where it was dried by means of a current of warm air, through a solution containing an unknown quantity of fluoride ion, through a region where it was dried in a current of warm air, through a solution of cerous ($Ce^{+3}$) ion made radioactive by the presence of the isotope cerium-144, through a wash solution consisting of dilute acetic acid, and through a further region for drying in warm air before passing to a radiation detector.

The counting rate of this detector was displayed on a strip-chart recorder. The deflection of the recorder pen was directly proportional to the concentration of fluoride in the unknown solution and by substituting this solution from time to time with fluoride solutions of known strength to calibrate the apparatus, the concentration of fluoride ion in the unknown solution could be read from the strip-chart recorder.

In one particular run with this apparatus, the cerous solution was 0.05 molar and the concentration of the isotope cerium-144 was approximately 1 micro-curie per millilitre. The acetic acid wash solution was 0.1 molar and various strengths of sodium fluoride solution up to 0.07 molar were tested.

The apparatus gave a mean count rate of 714 counts per minute when no fluoride was present in solution (i.e., in pure water) and this increased in linear fashion with the concentration of fluoride ion until it reached a mean value of about 18,500 counts per minute when the concentration of fluoride ion was 0.07 m. The detector in this case was a cylindrical crystal of sodium iodide having a transverse hole through which the asbestos string was drawn.

Scintillations arising in the crystal were converted to electrical pulses by standard electronic techniques and fed to a count ratemeter and then to a strip-chart recorder from which the above figures were recorded.

Thus it may be seen that the present invention provides a rapid means for detecting and/or estimating the concentration of non-radioactive materials present, either in the atmosphere or in solution. All that is necessary in order to be able to detect and/or estimate a particular material is that the material be capable of forming a precipitate containing a radio-active isotope, so that the resultant precipitate will also exhibit radio-activity when isolated in the pores of a region of porous material in the manner described herein.

What I claim is:

1. A method for the detection of a non-radioactive material, which comprises the steps of impregnating a localized region of a porous medium with a portion of a solution suspected to contain said material; treating the impregnated region with a solution of a radioactive substance which forms a precipitate with said material; washing said impregnated region to remove unreacted radio-active solution; and passing said porous medium to a radiation measuring device to detect any radiation which may be present in said impregnated region.

2. A method as claimed in claim 1, wherein said suspected solution is prepared by absorbing atmospheric dust on a support and treating said support with a solvent for said material.

3. A method as claimed in claim 1, wherein said material is beryllium and the precipitant is a solution of di-ammonium phosphate made radio-active by the presence of the isotope phosphorus-32.

4. A method as claimed in claim 1, wherein said material is the chloride ion and the precipitant is an acidified solution of silver nitrate made radio-active by the presence of the isotope silver-110m.

5. A method as claimed in claim 1, wherein said material is the fluoride ion and the precipitant is a solution of the cerous ($Ce^{+3}$) ion made radio-active by the presence of the isotope cerium-144.

6. A method of determining the concentration of a non-radioactive material in a first solution, which comprises the steps of impregnating a porous medium in different regions with (a) said first solution and (b) a second solution of the material of known concentration precipitating the material in both impregnated regions with a radio-active precipitant, washing both impregnated regions to remove unreacted precipitant therefrom, measuring the radio-activity of the two impregnated regions, the respective measured radio-activity values serving to determine therefrom the concentration in said first solution.

7. A method as claimed in claim 6, wherein spaced apart regions of the porous medium are impregnated with said first solution and regions intermediate said spaced-apart regions are impregnated with said second solution.

8. A method as claimed in claim 6, wherein said solutions are applied continuously at fixed rates to a moving band of the porous medium to form thereon parallel impregnated regions in the form of continuous lines.

9. A method as claimed in claim 6, wherein said first solution is prepared by absorbing atmospheric dust on a support and treating said support with a solvent for the material.

10. A method as claimed in claim 6, wherein the material is beryllium and the precipitant is a solution of di-ammonium phosphate made radio-active by the presence of the isotope phosphorus-32.

11. A method claimed in claim 6, wherein the material is the chloride ion and the precipitant is an acidified solution of silver nitrate made radio-active by the presence of the isotope silver-110m.

12. A method as claimed in claim 6, wherein the material is the fluoride ion and the precipitant is a solution of the cerous ($Ce^{+3}$) ion made radio-active by the presence of the isotope cerium-144.

13. A method for the detection of beryllium dust in the atmosphere, which comprises the steps of absorbing atmospheric dust on a support; treating said support with a solvent for beryllium to form a solution thereof; impregnating a localized region of a porous medium with a portion of said solution; treating said impregnated region with a solution of di-ammonium phosphate rendered radio-active by the presence of the isotope phosphorus-32 to thereby precipitate any beryllium present as radio-active beryllium ammonium phosphate; washing said impregnated region to remove unreacted di-ammonium phosphate solution; and passing said porous medium to a radiation measuring device to detect any radiation which may be present in said impregnated region.

14. A method of determining the concentration of beryllium in the atmosphere, which comprises the steps of absorbing a measured sample of the beryllium-containing atmosphere on a support; treating said support with a solvent for beryllium to form a known volume of a solution thereof of unknown strength; impregnating a porous medium at different places with measured amounts of (a) the beryllium solution of unknown strength and (b) a beryllium solution of known strength; treating both impregnated regions with a solution of di-ammonium phosphate rendered radio-active by the presence of the isotope phosphorus-32 to precipitate beryllium as radio-active beryllium ammonium phosphate within said porous medium; washing both impregnated regions to remove unreacted di-ammonium phosphate solution therefrom; measuring the radio-activity of the two impregnated regions, the respective measured radio-activity values serving to establish the concentration of beryllium in said solution of unknown strength, the last-named concentration serving, in turn, as a basis to determine therefrom the concentration of beryllium in the atmosphere.

15. A continuous method of determining the concentration of beryllium in the atmosphere, which comprises the steps of continuously absorbing measured samples of the beryllium-containing atmosphere on supports; treating said supports with a solvent for beryllium to form known volumes of solutions thereof of unknown strength; continuously impregnating spaced-apart regions of a moving band of a porous medium at fixed rates with (a) the beryllium solution of unknown strength and (b) a beryllium solution of known strength to form thereon parallel impregnated regions in the form of continuous lines; continuously treating said impregnated regions with a solution of di-ammonium phosphate rendered radio-active by the presence of the isotope phosphorus-32 to precipitate beryllium as radio-active beryllium ammonium phosphate within said porous medium; continuously washing said impregnated regions to remove unreacted di-ammonium phosphate solution therefrom; continuously measuring the radio-activity of the impregnated regions, the respective measured radio-activity values serving to establish the concentration of beryllium in said solution of unknown strength, the last-named concentration serving, in turn, as a basis to determine therefrom the concentration of beryllium in the atmosphere.

16. A method of determining the concentration of chloride ion in a solution thereof, which comprises the steps of impregnating a porous medium at different places with measured amounts of (a) the chloride solution of unknown strength, and (b) a chloride solution of known strength; treating both impregnated regions with an acidified solution of silver nitrate made radio-active by the presence of the isotope silver-110m to precipitate radio-active silver chloride within said porous medium; washing both impregnated regions to remove unreacted silver nitrate solution therefrom; measuring the radio-activity of the two impregnated regions, the respective measured radio-activity values serving to determine therefrom the concentration of chloride ion in the solution of unknown strength.

17. A method of determining the concentration of fluoride ion in a solution thereof, which comprises the steps of impregnating a porous medium at different places with measured amounts of (a) the fluoride solution of unknown strength, and (b) a fluoride solution of known strength; treating both impregnated regions with a solution of the cerous ($Ce^{+3}$) ion made radio-active by the presence of the isotope cerium-144 to precipitate radio-active cerous fluoride within said porous medium; washing both impregnated regions to remove unreacted cerous ion solution therefrom; measuring the radio-activity of the two impregnated regions the respective measured radio-activity values serving to determine therefrom the concentration of fluoride ion in the solution of unknown strength.

References Cited by the Examiner

UNITED STATES PATENTS

| | | | |
|---|---|---|---|
| 2,691,109 | 10/1954 | Bernard | 250—83 |
| 2,915,639 | 12/1959 | Gilbert | 250—83 X |
| 2,968,722 | 1/1961 | Chleck et al. | 250—43.5 |
| 3,019,342 | 1/1962 | Brooke | 250—43.5 X |
| 3,109,096 | 10/1963 | Spaa | 250—106 X |

RALPH G. NILSON, *Primary Examiner.*

ARCHIE R. BORCHELT, *Examiner.*